(12) United States Patent
Batra et al.

(10) Patent No.: US 10,489,946 B1
(45) Date of Patent: Nov. 26, 2019

(54) GENERALIZED PRIMITIVES FOR SMOOTH COLORING OF VECTOR GRAPHICS ARTWORK IN CONSTANT TIME

(71) Applicant: Adobe Inc., San Jose, CA (US)

(72) Inventors: Vineet Batra, Delhi (IN); Mridul Kavidayal, Noida (IN); Ankit Phogat, Noida (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/023,521

(22) Filed: Jun. 29, 2018

(51) Int. Cl.
*G06T 11/40* (2006.01)
*H04N 1/60* (2006.01)
*G06T 11/00* (2006.01)

(52) U.S. Cl.
CPC ............ *G06T 11/40* (2013.01); *G06T 11/001* (2013.01); *H04N 1/6008* (2013.01); *G06T 2207/10024* (2013.01)

(58) Field of Classification Search
CPC ........ G06F 17/14; G06T 11/001; G06T 11/40; G06T 2207/10024; G06T 2200/24
See application file for complete search history.

(56) References Cited

U.S. PATENT DOCUMENTS

| 10,242,464 B1* | 3/2019 | Phogat | G06T 9/20 |
|---|---|---|---|
| 2009/0213143 A1* | 8/2009 | Igarashi | G06T 3/0093 345/643 |
| 2013/0127856 A1* | 5/2013 | Winnemoeller | G06T 17/20 345/423 |

OTHER PUBLICATIONS

Jacobson, A. et al., "Bounded Biharmonic Weights for Real-Time Deformation", ACM Trans. Graph., Jul. 2011, vol. 30, 8 pages.
Orzan, A. et al., "Diffusion Curves: A Vector Representation for Smooth-Shaded Images", ACM Trans. Graph., Aug. 2008, vol. 27, 8 pages.
Sun, X. et al., "Diffusion Curve Textures for Resolution Independent Texture Mapping", ACM Trans. Graph., Jul. 2012, vol. 31, 9 pages.
Yan, Z. et al., "K-curves: Interpolation at Local Maximum Curvature", ACM Trans. Graph., Jul. 2017, vol. 36, 7 pages.
U.S. Appl. No. 15/707,212, titled "Diffusion Coloring Using Weighted Color Points", filed Sep. 18, 2017, 27 pages. (Not published as of Jul. 12, 2018).

* cited by examiner

*Primary Examiner* — Antonio A Caschera
(74) *Attorney, Agent, or Firm* — Finch & Maloney PLLC

(57) ABSTRACT

Diffusion coloring of vector graphics artwork is performed in constant time based on the number of color channels in a specified color space. In some examples, a method may include establishing color handles within an artwork, and defining mesh vertices distributed throughout the artwork. The method may also include determining a resultant color at each mesh vertex by solving the Laplacian equation for each of i color channels in a color space, wherein solving the Laplacian equation for each of the i color channels produces a corresponding i color values that collectively define the resultant color. A color for a pixel in the artwork can be determined by interpolating between the resultant colors at the mesh vertices.

20 Claims, 14 Drawing Sheets
(11 of 14 Drawing Sheet(s) Filed in Color)

US 10,489,946 B1

GENERALIZED PRIMITIVES FOR SMOOTH COLORING OF VECTOR GRAPHICS ARTWORK IN CONSTANT TIME

FIELD OF THE DISCLOSURE

This disclosure relates generally to digital illustration, and more particularly, to smooth coloring of vector graphics artwork.

BACKGROUND

The geometry of vector graphics artwork can be defined by bounded cubic Bezier curves. Traditional methods of coloring curves in such artwork is by fills and gradients. Simple coloring can be accomplished using solid fills. For richer coloring, axial and radial gradients can be used, where a user defines a set of color locations and associated color values. The value of a color at a pixel inside an artwork shape is then computed by interpolating between these color points in the direction of the gradient (e.g., axial or radial). However, the resulting coloring using fills and gradients may be limited in terms of complexity. Moreover, the coloring that is produced using fills and gradients is unrelated to or uncoupled from the topology of the shape that is being colored, which significantly limits the creativity and expressiveness of the user.

Diffusion curves provide a more complex and rich form of coloring vector graphics. Diffusion curves are vector graphic primitives for creating smooth-shaded images. Each diffusion curve partitions the geometric space through which it is drawn, defining different colors on either side of the curve. When rendered, these colors then spread into the regions on both sides of the curve in a way analogous to diffusion. The colors may also be defined to vary smoothly along the curve, and the sharpness of the color transition from one side of the curve to the other may also be specified. Even though diffusion curves offer a rich coloring model they are not intuitive to use, and it is difficult to control the color values at the time of creation. Furthermore, the use of diffusion curves necessitates a color being computed for every pixel of the artwork whenever a change in viewing aperture is made, which is computationally expensive.

BRIEF DESCRIPTION OF THE DRAWINGS

The patent or application file contains at least one drawing executed in color. Copies of this patent or patent application with color drawing(s) will be provided by the Office upon request and payment of the necessary fee.

Figure 1:
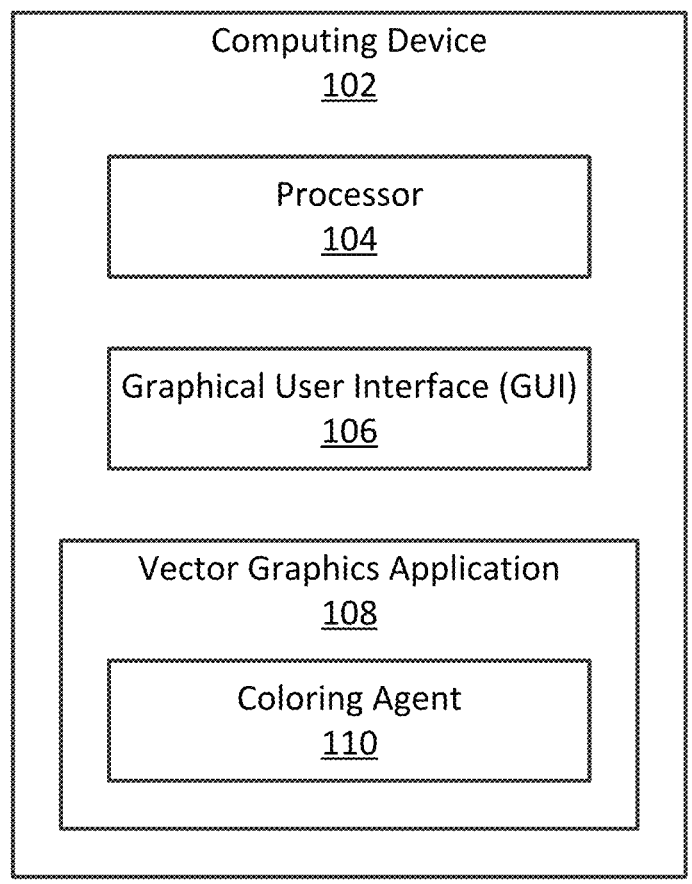
FIG. 1 is a block diagram illustrating selected components of an example vector graphics system, in accordance with an embodiment of the present disclosure.

In the following detailed description, reference is made to the accompanying drawings, which form a part hereof. The illustrative embodiments described in the detailed description, drawings, and claims are not meant to be limiting. Other embodiments may be used, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

DETAILED DESCRIPTION

Techniques are disclosed for diffusion coloring of vector graphics artwork using color points. A color point is associated with a location in the artwork and defines a color at that location. A color point may be a point color handle, a line color handle, or a curve color handle, and may be referred to herein as a "color handle", unless context dictates otherwise. As will be further described below, the color handles provide users increased flexibility and control in coloring vector graphics artwork. In addition, the diffusion coloring techniques as variously described herein formulate the coloring of the artwork as a variable of the number of color channels of a specified color space instead of the number of color handles in the artwork. This provides for smooth coloring in a computationally efficient manner that is independent of the number of color handles created in the artwork.

According to one example implementation, a user uses a vector graphics application and select a vector graphics artwork to colorize. The vector graphics application can represent the artwork by a set of cubic Bezier splines, which define a set of vertices that are distributed throughout the artwork being colored. To color the artwork, the user selects a desired color to apply to the artwork, for example, from a color picker. The user then selects a location inside the artwork to place (e.g., apply) the color at that location. Once the user specifies a location in the artwork, the vector graphics application creates a point color handle at the location in the artwork specified by the user. The user can then add another point color handle in the artwork by selecting the same or a different color from the color picker, and tapping or clicking a point in the artwork to place the selected color at that location. The user can repeat this process as desired to add any number, such as ten, twenty, fifty, or even a larger number, of point color handles and associated colors in the artwork.

In an example embodiment, the vector graphics application allows for changes to the point color handles in the artwork. For instance, subsequent to placing a point color handle or handles in the artwork, the user can select and drag any existing point color handle to a new position or location in the artwork. Additionally or alternatively, the user can select a new color for a point color handle existing in the artwork, for example, by tapping or clicking on an existing point color handle and selecting a desired color from the color picker to assign the new color to the existing point color handle (e.g., change the color of the existing point color handle). Further, the user can remove (e.g., delete) an existing point color handle in the artwork, for example, by double tapping or double clicking on the existing point color handle.

In some embodiments, the vector graphics application allows for the creation of line color handles in the artwork. A line color handle is a discrete point in the artwork that connects to another discrete point in the artwork, where a color is assigned to the connected discrete points (e.g., the pair of connected line color handles). To create line color handles, a user can connect a first point color handle and a second point color handle by plotting a line segment over the artwork from the first point color handle to the second point color handle, for example, using an option modifier key or other suitable input or combination of inputs. The line segment connecting the first and second point color handles is defined by the edge that connects the discrete points plotted over the artwork between the two point color handles. Connecting two point color handles by such a line segment effectively converts the two point color handles at each end of the line segment to respective line color handles. As will be appreciated in light of this disclosure, a line color handle can be connected to any number of line segments, such as one, two, three, five, ten, or even a larger number of line segments.

Similar to point color handles, the vector graphics application allows for changes to line color handles in the artwork. For instance, subsequent to creating line color handles in the artwork, the user can select and drag any existing line color handle to a new position or location in the artwork. In response to such user action, the vector graphics application repositions the line segment or segments connected to the repositioned line color handle to pass through the new position of the repositioned line color handle. The user can similarly change the color of a line color handle and remove an existing line color handle in the artwork.

In some embodiments, the vector graphics application allows for the creation of curve color handles in the artwork. A curve color handle is a discrete point in the artwork that connects to another discrete point in the artwork by a curve segment, such as a cubic Bezier segment, where a color is assigned to the connected discrete points (e.g., the pair of connected curve color handles). To create curve color handles, a user can connect a first point color handle and a second point color handle with a curve segment. Once a curve segment is created, the user can manipulate the curve segment to a desired shape, for example, by selecting and dragging a point on the curve segment to a new position or location in the artwork. The curve segment connecting the first and second point color handles is defined by the discrete points located on the curve segment between the two point color handles. Connecting two point color handles by such a curve segment effectively converts the two point color handles at each end of the curve segment to respective curve color handles. As will be appreciated in light of this disclosure, a curve color handle can be connected to any number of curve segments, such as one, two, three, five, ten, or even a larger number of curve segments.

Similar to point and line color handles, the vector graphics application allows for changes to curve color handles in the artwork. For instance, subsequent to creating curve color handles in the artwork, the user can select and drag any existing curve color handle to a new position or location in the artwork. In response to such user action, the vector graphics application repositions the curve segment or segments connected to the repositioned curve color handle to pass through the new position of the repositioned curve color handle. Additionally or alternatively, the user can select any point on a curve segment, and drag the selected point to a new position or location in the artwork. In response to such user action, the vector graphics application repositions or reshapes the curve segment to pass through the new position of the repositioned point. The user can similarly change the color of a curve color handle and remove an existing curve color handle in the artwork.

In an embodiment, the vector graphics application is configured to color the artwork using diffusion coloring in accordance with the location of each color handle in the artwork, and the respective color assigned to each color handle in the artwork. For instance, the vector graphics application accepts such user actions to create and/or change color handles as inputs and produces diffusion coloring of the artwork in response. Additionally or alternatively, the user can request the vector graphics application to color the artwork. In the case of point color handles, the color associated with a point color handle emanates (or diffuses) along a radial direction from the location of the point color handle in the artwork.

In the case of line color handles, for each pair of connected line color handles, the color associated with the line color handle at one end of the line segment and the color associated with the other connected line color handle at the other end of the line segment "flows" along the direction of the line segment. That is, the vector graphics application diffuses the respective color assigned to the connected pair of line color handles such that the respective colors flow from each of the connected line color handles along the direction of the line segment. As such, the created line segment between two line color handles can be considered a linear gradient in that the color follows the direction of the line segment. In some implementations, the created line segment between a pair of line color handles functions as a barrier or boundary between the two sides of the line segment, such that the color or colors on one side of the line segment is not diffused to the other side of the line segment, and vice-versa. In this manner, line color handles provide rigidity in the color flow in that the color on one side of a line segment connecting two line color handles in an artwork is not allowed to pass through the line segment to the other side of the line segment.

In the case of curve color handles, for each pair of connected curve color handles, the color associated with the curve color handle at one end of the curve segment and the color associated with the other connected curve color handle at the other end of the curve segment "flows" along the curve segment. That is, the vector graphics application diffuses the respective color assigned to the connected pair of curve color handles such that the respective colors flow from each of the connected curve color handles along the curve segment. As such, the created curve segment between two curve color handles is a free formed gradient that is shape-aware in that the color follows the shape of the curve segment and, in some instances, the shape of the artwork. In some implementations, the created curve segment between a pair of curve color handles functions as a barrier or boundary between the two sides of the curve segment, such that the color or colors on one side of the curve segment is not diffused to the other side of the curve segment, and vise-versa. In this manner, curve color handles provide rigidity in the color flow in that the color on one side of a curve segment connecting two curve color handles in an artwork is not allowed to pass through the curve segment to the other side of the curve segment.

In some embodiments, coloring the artwork is modeled using a Laplacian equation. In such embodiments, the vector graphics application formulates the coloring of the artwork as assigning colors to discretized mesh vertices. For instance, in accordance with some embodiments of the present disclosure, a color at a mesh vertex is determined by solving the Laplacian equation using the color handles to initialize boundary conditions to the Laplacian equation. Using the colors of the color handles as boundary conditions provides smoothness of color across the artwork. As the vector graphics application formulates the computation of the color at a mesh vertex as a variable of the color channels of the color space (e.g., Red, Green, Blue, in the RGB color space; Cyan, Magenta, Yellow, and Black in the CMYK color space; etc.), the vector graphics application is able to re-compute to coloring at interactive rates to provide real-time or near real-time rendering of the colored artwork irrespective of the number of color handles in the artwork. Subsequent to each calculation or re-calculation of the colors, the vector graphics application produces a rendered artwork having the diffused pixel colors. The rendered artwork includes the colors smoothly blended according to the known colors assigned to the color handles as specified by the user. Having colored the artwork, the vector graphics application can recolor the artwork upon detecting a change to the artwork, in some embodiments. For example, a change can be caused by creation of a new color handle in the artwork, selection of a new color for an existing color handle in the artwork, removal of an existing color handle from the artwork, movement of an existing color handle to a new location in the artwork, change to an existing line segment or curve segment in the artwork, or a change in the shape of the artwork. Such a change to the artwork causes the blended color appearance of the artwork to change accordingly.

The disclosed techniques significantly improve the speed and efficiency of coloring a vector graphics artwork in the context of a vector graphics application (e.g., Adobe® Illustrator® or any other vector graphics application that can benefit from efficient, rich, and intuitive vector graphics coloring techniques provided herein). For example, in certain embodiments, the techniques provide for computation of a color for the pixel locations in an artwork in amortized constant time by solving for the number of channels in a specified color space used in coloring the artwork. As the computation of the colors is time dependent on the number of channels in the specified color space and not on the number of color handles created in the artwork, large numbers of color handles can be included in an artwork without degrading the performance of the vector graphics application. This enables the user to create photo-realistic coloring and appearance of the artwork in a computationally efficient manner, thereby allowing the user to see color manipulations in real-time or near real-time. Furthermore, certain of the techniques disclosed herein provide improved creativity in expression and coloring by allowing the user to intuitively and easily generate shape-aware gradients, including line and/or curve color handles, that follow the shape of the artwork. These and other advantages and alternative embodiments will be apparent in light of this disclosure.

System Architecture

FIG. 1 is a block diagram illustrating selected components of an example vector graphics system 100, in accordance with an embodiment of the present disclosure. System 100 includes a computing device 102, which includes a processor 104, a graphical user interface (GUI) 106, and a vector graphics application 108. Computing device 102 is configured to execute vector graphics application 108, which includes a coloring agent 110. In an example embodiment, vector graphics application 108 may be implemented as computer-executable instructions stored on a non-transitory computer-readable medium that is readable by processor 104 that, when executed by such processor 104, causes computing device 102 to perform the various operations described further herein for such vector graphics application 108 including coloring agent 110. In various embodiments, additional components (not illustrated, such as a display, communication interface, etc.) or a subset of the illustrated components can be employed without deviating from the scope of the present disclosure. For instance, other embodiments may integrate the various functionalities of coloring agent 110 into fewer components (e.g., incorporate into vector graphics application 108) or more components (e.g., two or three, or more). In addition, further note that the various components of computing device 102 may all be in a stand-alone computing system according to some embodiments, while in others, may be distributed across multiple machines. For example, coloring agent 110 may be provided in a computing system distinct from computing device 102. Additionally or alternatively, GUI 106 may be provided in a computing device distinct from computing device 102. Further note that GUI 106 may be integrated into vector graphics application 108, or vice-versa. In a more general sense, the degree of integration and distribution of the functional component(s) provided herein can vary greatly from one embodiment to the next, as will be appreciated in light of this disclosure.

Vector graphics application 108 is generally configured to facilitate the creating and coloring of vector graphics artwork. Briefly, in overview, coloring agent 110 is configured to provide for coloring of vector graphics artwork using a variety of color points. As described previously, coloring of an artwork is performed in constant time independent of the number of color points in the artwork. According to the embodiment shown in FIG. 1, coloring agent 110 is incorporated into vector graphics application 108, and allows vector graphics application 108 to generally support the real-time or near real-time coloring of vector graphics artwork.

In more detail, coloring agent 110 is configured to perform the calculations to generate a coloring of an artwork based on the known colors at the color handles in the artwork. In accordance with some embodiments of the present disclosure, coloring agent 110 may re-compute the coloring of the artwork in response to any modification to the artwork, including generation and/or deletion of point color handles, line color handles, and curve color handles in the artwork, as well as any other modifications to the artwork. Subsequent to each recoloring, coloring agent 110 may cause the rendering of the recolored artwork with the updated color. The operation of coloring agent 110 is further described below with respect to FIGS. 2-17.

Figure 2:
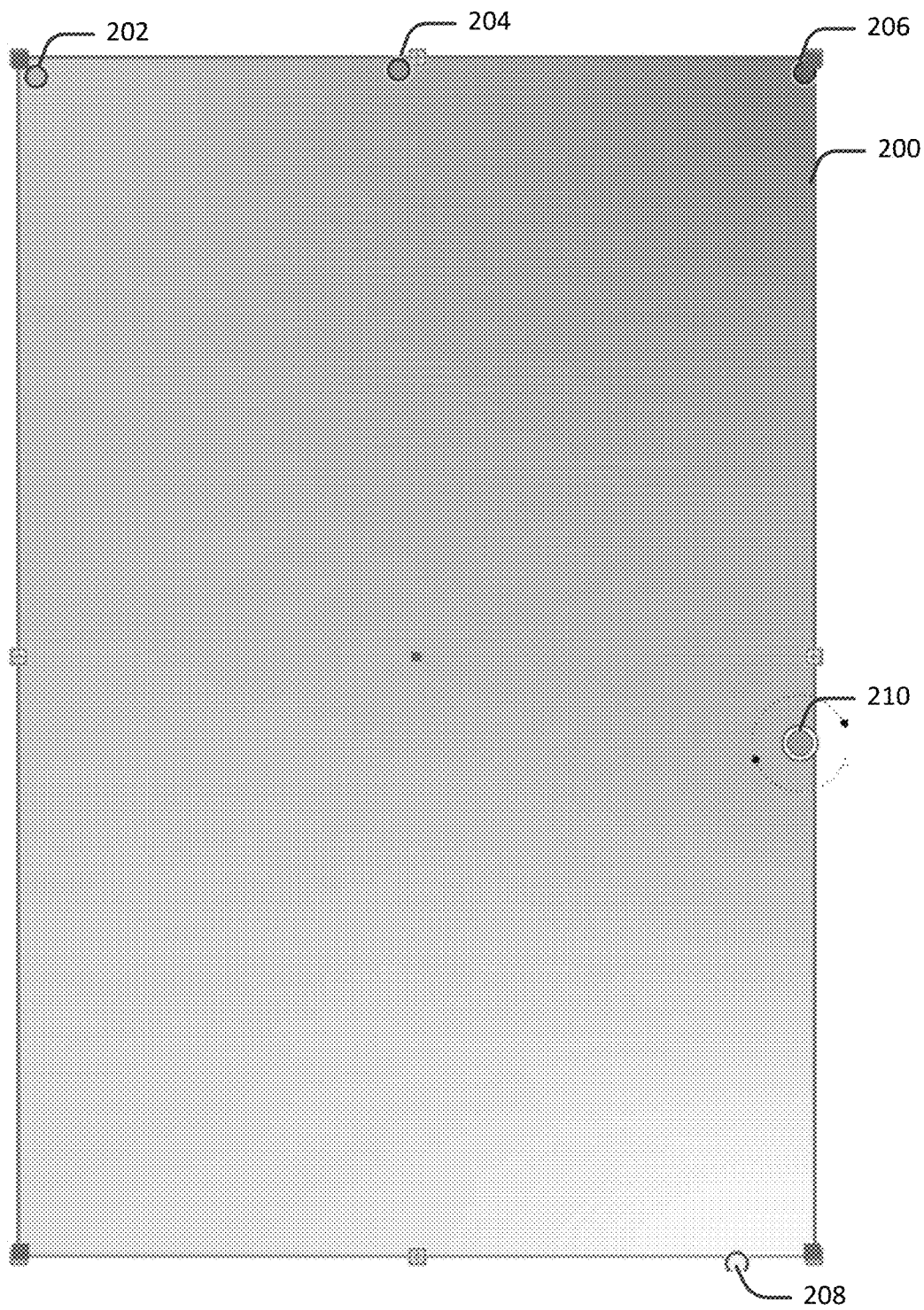
FIG. 2 illustrates an example vector graphics artwork including point color handles, in accordance with an embodiment of the present disclosure.

An example use case and embodiment of vector graphics application 108 is shown in FIG. 2, where an example vector graphics artwork 200 is specified for coloring. As can be seen, artwork 200 is of a rectangular shape, and includes point color handles 202, 204, 206, 208, and 210. In artwork 200, each point color handle 202, 204, 206, 208, and 210 is depicted as a circle, and the color inside the circle is the selected color for the point color handle. As depicted, point color handle 202 defines a light red color point, point color handle 204 defines a red color point, point color handle 206 defines a dark red color point, point color handle 208 defines a light orange color point, and point color handle 210 defines a green color point. The color defined by each point color handle 202, 204, 206, 208, and 210 in artwork 200 emanates (or diffuses) along a radial direction from each point color handle 202, 204, 206, 208, and 210 to smoothly color artwork 200, as illustrated by the directional circle around point color handle 210.

In the example use case of FIG. 2, a user can use vector graphics application 108 to create point color handles 202, 204, 206, 208, and 210 to color artwork 200. For example, the user can first create point color handle 202 to place a light red color in artwork 200 at the location of point color handle 202. The user can similarly create point color handles 204, 206, 208, and 210 to place the respective color defined by point color handles 204, 206, 208, and 210 in artwork 200 at the locations of point color handles 204, 206, 208, and 210. Having created point color handles 202, 204, 206, 208, and 210 in artwork 200, the user can request vector graphics application 108 to color artwork 200. Such user action causes vector graphics application 108 to color artwork 200 using the respective color defined by the color handles presently in artwork 200, for example, point color handles 202, 204, 206, 208, and 210, in this instance. Artwork 200 as depicted in FIG. 2 illustrates the diffused coloring resulting from the colors defined by point color handles 202, 204, 206, 208, and 210 in artwork 200. As can be seen, the diffused coloring is the result of the light red color emanating from point color handle 202, the red color emanating from point color handle 204, the dark red color emanating from point color handle 206, the light orange color emanating from point color handle 208, and the green color emanating from point color handle 210. The diffused coloring results in the color from each point color handle 202, 204, 206, 208, and 210 blending smoothly in artwork 200. The user can subsequently make a change to artwork 200, which causes vector graphics application 108 to recolor artwork 200 to account for the change made to artwork 200.

Figure 3:
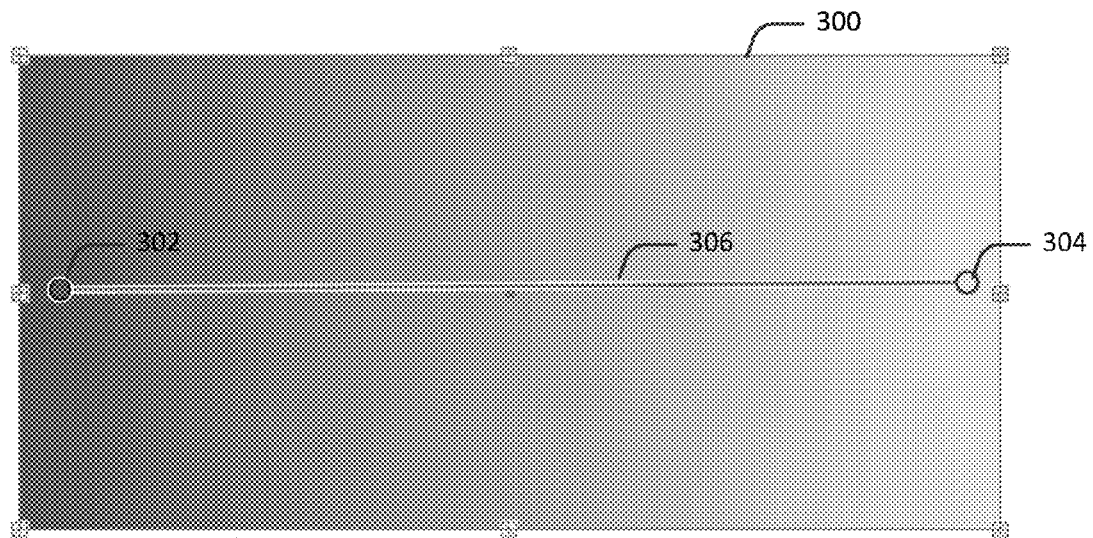
FIG. 3 illustrates example linear gradients represented with line color handles in a vector graphics artwork, in accordance with an embodiment of the present disclosure.

Another example use case and embodiment of vector graphics application 108 is shown in FIG. 3, where an example vector graphics artwork 300 is specified for coloring. As can be seen, artwork 300 is of a rectangular shape, and includes line color handles 302 and 304 connected by a line segment 306. In artwork 300, each line color handle 302 and 304 is depicted as a circle, and the color inside the circle is the selected color for the line color handle. As depicted, line color handle 302 defines a red color point, and line color handle 304 defines a yellow color point. The color defined by each line color handle 302 and 304 in artwork 300 emanates from each line color handle 302 and 304 along the direction of line segment 306 to smoothly color artwork 300.

In the example use case of FIG. 3, a user can use vector graphics application 108 to create line color handles 302 and 304 to color artwork 300. For example, the user can first create a first point color handle to place a red color in artwork 300 at the location of line color handle 302. The user can similarly create a second point color handle to place a yellow color in artwork 300 at the location of line color handle 304. The user can then create line color handles 302 and 304 by connecting the first point color handle and the second point color handle with line segment 306. Connecting the first and second point color handles effectively converts the first and second point color handles to line color handles 302 and 304, respectively. Having created line color handles 302 and 304 in artwork 300, the user can request vector graphics application 108 to color artwork 300. Such user action causes vector graphics application 108 to color artwork 300 using the respective color defined by the color handles presently in artwork 300, for example, line color handles 302 and 304, in this instance. Artwork 300 as depicted in FIG. 3 illustrates the diffused coloring resulting from the colors defined by line color handles 302 and 304 in artwork 300. As can be seen, the diffused coloring is the result of the red color emanating from line color handle 302 and the yellow color emanating from line color handle 304 along the direction of line segment 306. The coloring of artwork 300 illustrates a linear gradient of the respective colors red and yellow between line color handles 302 and 304 along line segment 306.

Figure 4:
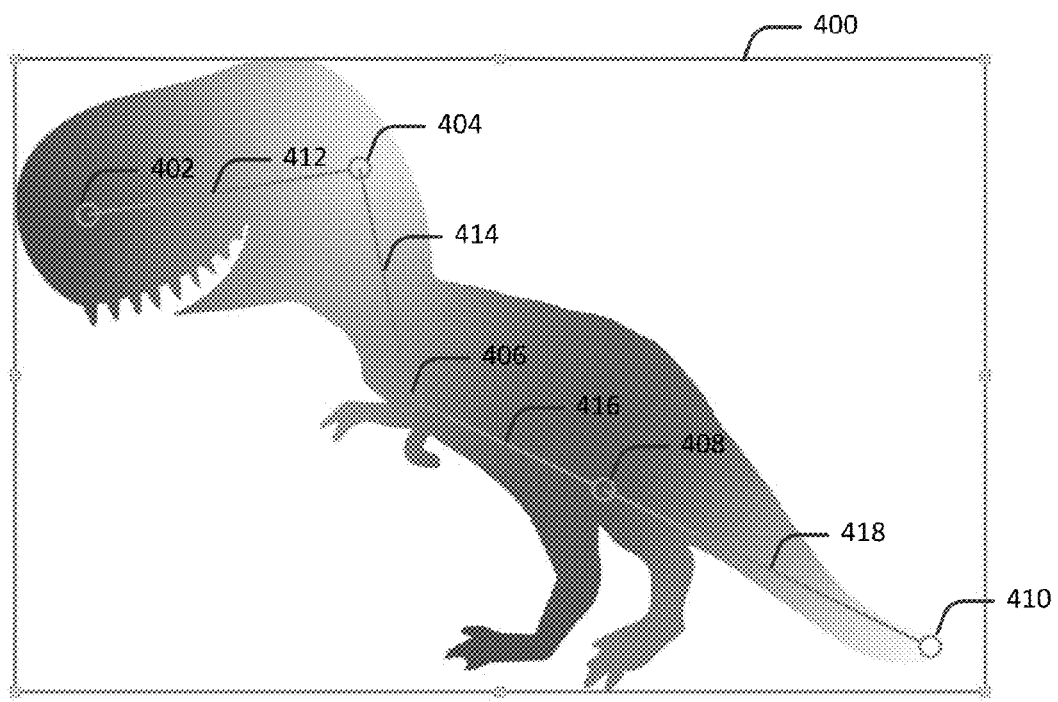
FIG. 4 illustrates an example color flow along various directions of line segments connecting pairs of line color handles in a vector graphics artwork, in accordance with an embodiment of the present disclosure.

Still another example use case and embodiment of vector graphics application 108 is shown in FIG. 4, where an example vector graphics artwork 400 is specified for coloring. As can be seen, artwork 400 is an image of a dinosaur, and includes line color handles 402, 404, 406, 408, and 410. In particular, line color handles 402 and 404 are connected by a line segment 412, line color handles 404 and 406 are connected by a line segment 414, line color handles 406 and 408 are connected by a line segment 416, and line color handles 408 and 410 are connected by a line segment 418. In artwork 400, each line color handle 402, 404, 406, 408, and 410 is depicted as a circle, and the color inside the circle is the selected color for the line color handle. As depicted, line color handle 402 defines a red color point, line color handle 404 defines a yellow color point, line color handle 406 defines a blue color point, line color handle 408 defines a ruby color point, and line color handle 410 defines a very light pink color point.

Artwork 400 as depicted in FIG. 4 illustrates the diffused coloring resulting from the colors defined by line color handles 402, 404, 406, 408, and 410 in artwork 400. As can be seen, the diffused coloring is the result of the red color emanating from line color handle 402 and the yellow color emanating from line color handle 404 along the direction of line segment 412, the yellow color emanating from line color handle 404 and the blue color emanating from line color handle 406 along the direction of line segment 414, the blue color emanating from line color handle 406 and the ruby color emanating from line color handle 408 along the direction of line segment 416, and the ruby color emanating from line color handle 408 and the very light pink color emanating from line color handle 410 along the direction of line segment 418. For each pair of connected line color handles, the color flows from the color defined by line color handle 402 located at the tip of the nose of the dinosaur to the color defined by line color handle 410 located at the tip of the tail of the dinosaur along the respective directions of the line segments connecting the pairs of line color handles to smoothly color artwork 400. In a general sense, as can be seen in artwork 400 depicted in FIG. 4, line segments 412, 414, 416, and 418 provide linear gradients in that the color flows in the direction of the line segments through the dinosaur.

Figure 5:
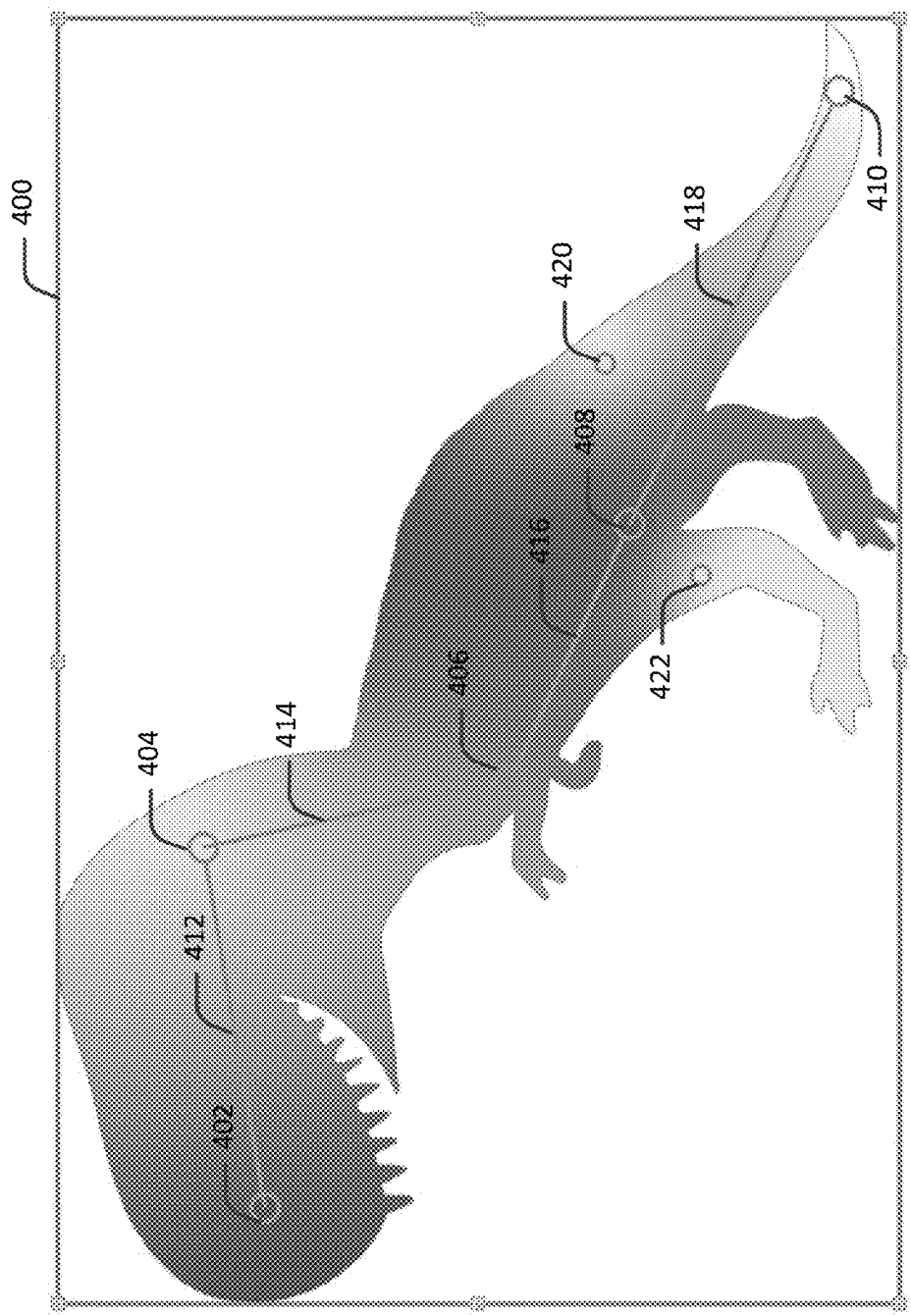
FIG. 5 illustrates the line segments connecting pairs of line color handles in the vector graphics artwork of FIG. 4 functioning as a color barrier, in accordance with an embodiment of the present disclosure.

A further use case and embodiment of vector graphics application 108 and artwork 400 is shown in FIG. 5. Artwork 400 as depicted in FIG. 5 further includes point color handles 420 and 422 in addition to line color handles 402, 404, 406, 408, and 410. Point color handles 420 and 422 are each depicted as a circle, and the color inside the circle is the selected color for the point color handle. As depicted, point color handle 420 defines a yellow color point and is located above line segment 418 in artwork 400, and point color handle 422 defines a yellow color point and is located below line segment 416 towards line color handle 418. As can be seen, the diffused coloring is the result of the yellow color emanating from point color handles 420 and 422, in addition to the colors emanating from line color handles 402, 404, 406, 408, and 410. Note that the yellow color emanating from point color handle 420 located above line segment 418 is not diffused across line segment 418. That is, line segment 418 serves as a color barrier in that the yellow color diffused from point color handle 420 does not pass through line segment 418. Further note that the yellow color emanating from point color handle 422 located below line segments 416 and 418 is not diffused across line segments 416 and 418. In a general sense, as can be seen in artwork 400 depicted in FIG. 5, line segments 412, 414, 416, and 418 provide rigidity in the color flow through the dinosaur.

Figure 6:
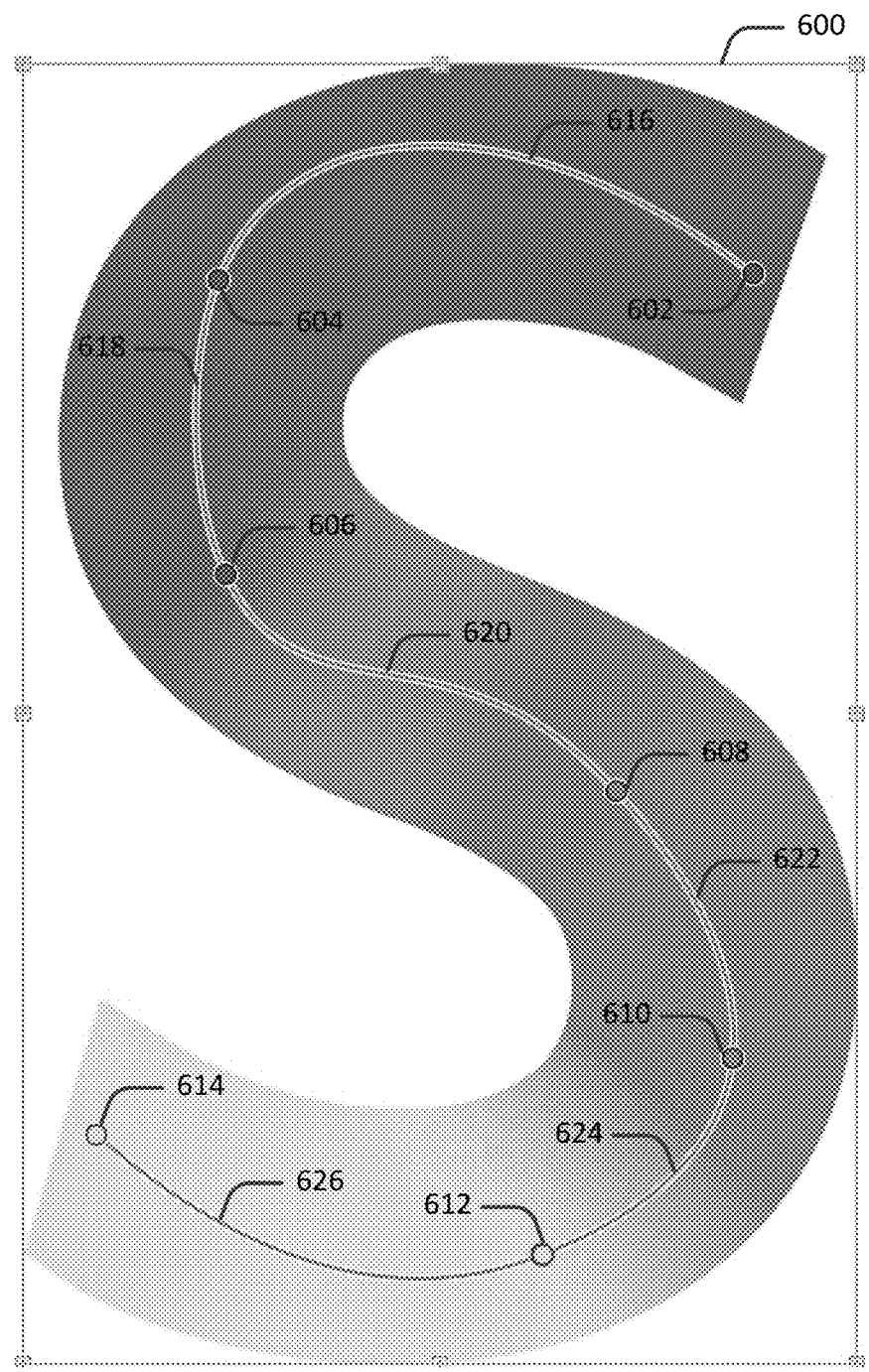
FIG. 6 illustrates an example color flow along the shapes of curve segments connecting pairs of curve color handles in a vector graphics artwork, in accordance with an embodiment of the present disclosure.

An example use case and embodiment of vector graphics application 108 is shown in FIG. 6, where an example vector graphics artwork 600 is specified for coloring. As can be seen, artwork 600 is an image of the letter "S", and includes curve color handles 602, 604, 606, 608, 610, 612, and 614. In particular, curve color handles 602 and 604 are connected by a curve segment 616, curve color handles 604 and 606 are connected by a curve segment 618, curve color handles 606 and 608 are connected by a curve segment 620, curve color handles 608 and 610 are connected by a curve segment 622, curve color handles 610 and 612 are connected by a curve segment 624, and curve color handles 612 and 614 are connected by a curve segment 626. In artwork 600, each curve color handle 602, 604, 606, 608, 610, 612, and 614 is depicted as a circle, and the color inside the circle is the selected color for the curve color handle. In some embodiments, a curve segment, such as curve segments 616, 618, 620, 622, 624, and 626, is implemented as a cubic Bezier segment. As depicted, curve color handles 602, 604, and 606 each define a red color point, curve color handles 608 and 610 each define a blue color point, and curve color handles 612 and 614 each define a yellow color point.

Figure 7:
FIG. 7 illustrates an example coloring of the vector graphics artwork of FIG. 6 using free form gradients created using curve color handles, in accordance with an embodiment of the present disclosure.

Artwork 600 as depicted in FIG. 6 illustrates the diffused coloring resulting from the colors defined by curve color handles 602, 604, 606, 608, 610, 612, and 614 in artwork 600. As can be seen, the diffused coloring is the result of the red color emanating from curve color handle 602 and the red color emanating from curve color handle 604 along the shape of curve segment 616, the red color emanating from curve color handle 604 and the red color emanating from curve color handle 606 along the shape of curve segment 618, the red color emanating from curve color handle 606 and the blue color emanating from curve color handle 608 along the shape of curve segment 620, the blue color emanating from curve color handle 608 and the blue color emanating from curve color handle 610 along the shape of curve segment 622, the blue color emanating from curve color handle 610 and the yellow color emanating from curve color handle 612 along the shape of curve segment 624, and the yellow color emanating from curve color handle 612 and the yellow color emanating from curve color handle 614 along the shape of curve segment 626. For each pair of connected curve color handles, the color flows from the color defined by curve color handle 602 located towards the top-right of the letter "S" to the color defined by curve color handle 614 located towards the bottom-left of the letter "S" along the respective shapes of the curve segments connecting the pairs of curve color handles to smoothly color artwork 600. As can be seen in artwork 600 depicted in FIG. 6, curve segments 616, 618, 620, 622, 624, and 626 are free formed gradients that are shape-aware in that the color follows the shape of the curve segments through the letter "S". FIG. 7 illustrates a vector graphics artwork 700 that corresponds to artwork 600 without showing the curve color handles and curve segments. As can be seen, artwork 700 illustrates the diffused coloring that follows the shape of the letter "S".

Figure 8:
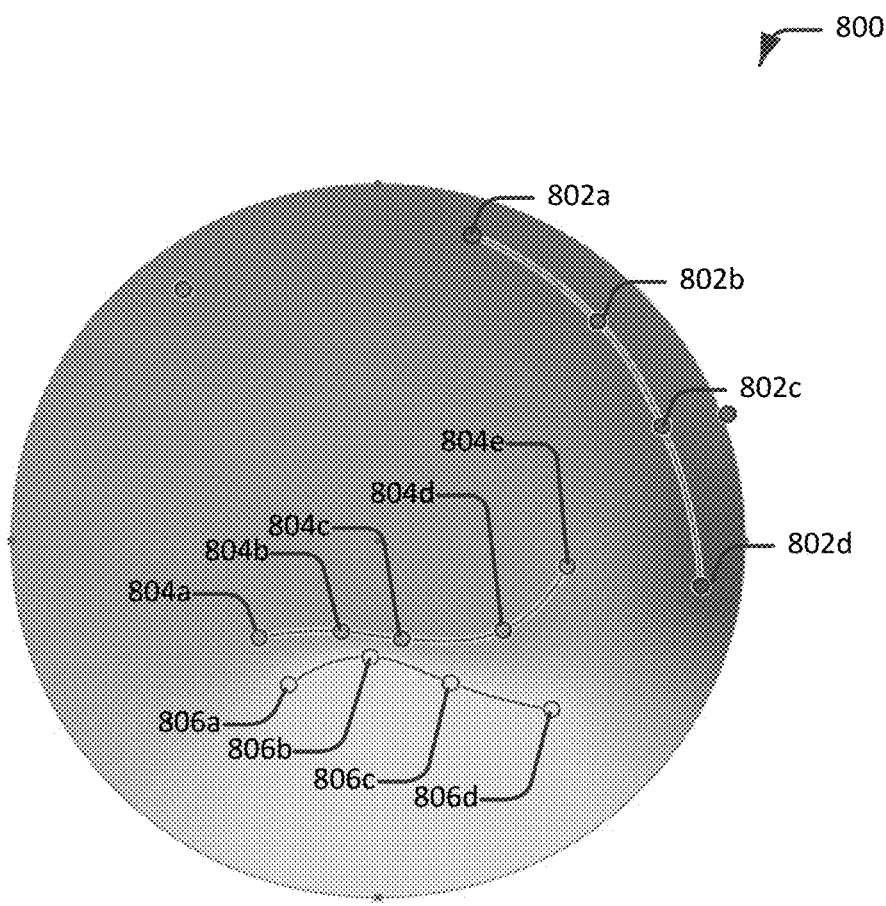
FIG. 8 illustrates an example vector graphics artwork including curve segments functioning as color barriers, in accordance with an embodiment of the present disclosure.

Another example use case and embodiment of vector graphics application 108 is shown in FIG. 8, where an example vector graphics artwork 800 is specified for coloring. As can be seen, artwork 800 is of a circular shape, and includes curve color handles 802a-802d, 804a-804e, and 806a-806d. In particular, curve color handles 802a-802d connect three curve segments, curve color handles 804a-804e connect four curve segments, and curve color handles 806a-806d connect three curve segments. In artwork 800, each curve color handle 802a-802d, 804a-804e, and 806a-806d is depicted as a circle, and the color inside the circle is the selected color for the curve color handle. As depicted, curve color handles 802a-802d each define a red color point, curve color handles 804a-804e each define a blue color point, and curve color handles 806a-806d each define a yellow color point. As can be seen, the diffused coloring is the result of the red color emanating from curve color handles 802a-802d, the blue color emanating from curve color handles 804a-804e, and the yellow color emanating from curve color handles 806a-806d. Note that the red color emanating from curve color handles 802a-802d is not diffused across the curve segments connected by curve color handles 804a-804e. Similarly, the blue color emanating from curve color handles 804a-804e is not diffused across the curve segments connected by curve color handles 802a-802d and the curve segments connected by curve color handles 806a-806d, and the yellow color emanating from curve color handles 806a-806d is not diffused across the curve segments connected by curve color handles 804a-

804e. In a general sense, as can be seen in artwork 800, the multiple curve segments serve as color barriers and provide rigidity in the color flow in artwork 800.

Methodology

Figure 9:
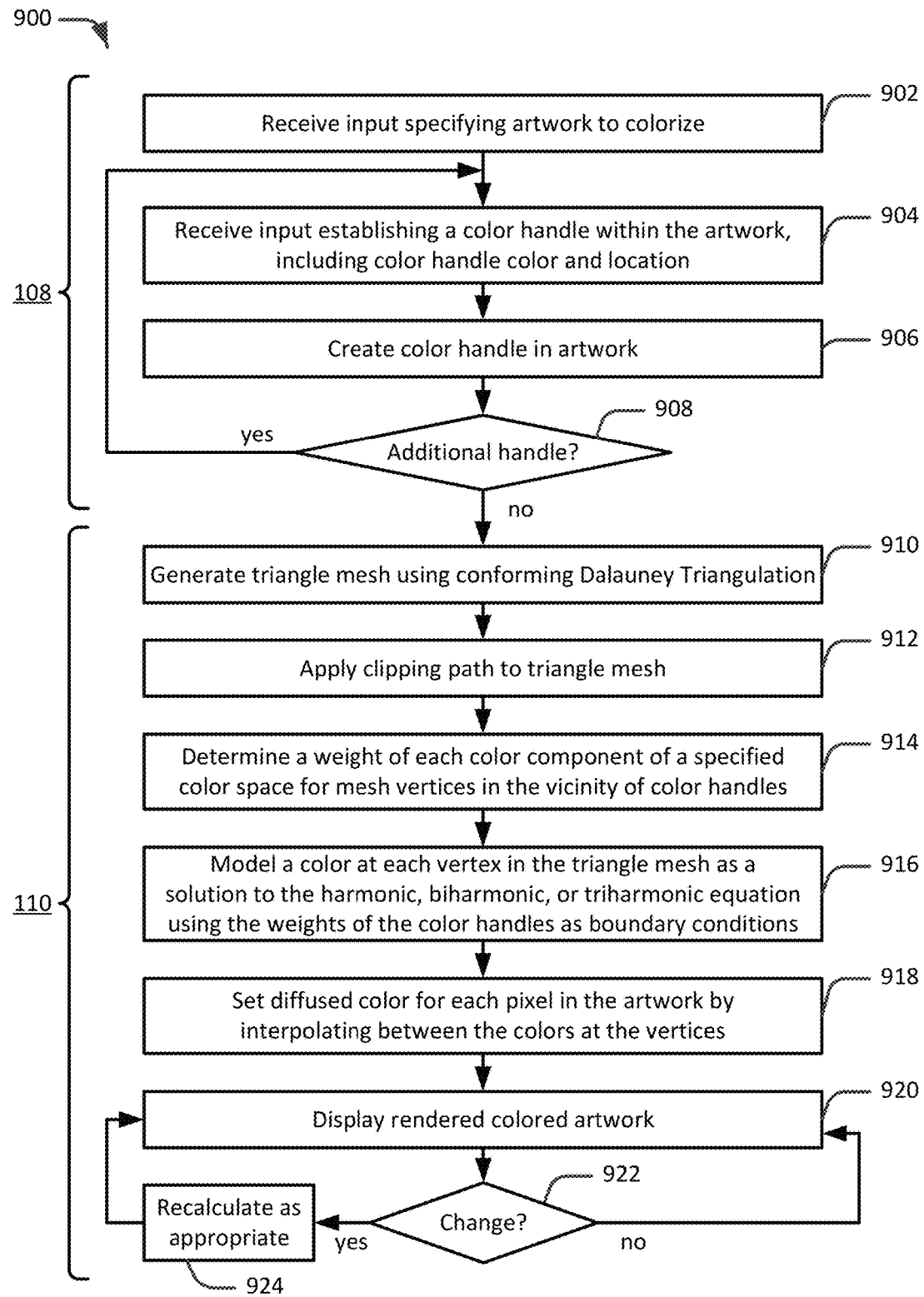
FIG. 9 is a flow diagram illustrating an example process for diffusion coloring using weighted color channels in a color space, in accordance with an embodiment of the present disclosure.

FIG. 9 is a flow diagram illustrating an example process 900 for diffusion coloring using weighted color channels in a color space, in accordance with an embodiment of the present disclosure. The operations, functions, or actions illustrated in example process 900 may in some embodiments be performed by various components of vector graphics system 100 and, more particularly, vector graphics application 108 and coloring agent 110 of computing device 102 of FIG. 1. The operations, functions, or actions described in the respective blocks of process 900 may also be stored as computer-executable instructions in a non-transitory computer-readable medium, such as a memory and/or a data storage of a computing system. In some instances, process 900 may be performed by components of computing device 102. Further note that the various operations depicted in process 900 do not need to be assigned to the specific example modules shown.

As will be further appreciated in light of this disclosure, for this and other processes and methods disclosed herein, the functions performed in the processes and methods may be implemented in differing order. Additionally or alternatively, two or more operations may be performed at the same time or otherwise in an overlapping contemporaneous fashion. Furthermore, the outlined actions and operations are only provided as examples, and some of the actions and operations may be optional, combined into fewer actions and operations, or expanded into additional actions and operations without detracting from the essence of the disclosed embodiments. To this end, process 900 is provided to give one example embodiment and is not intended to limit the methodology to any particular physical or structural configuration.

With reference to process 900, at block 902, input is received specifying an artwork to colorize. By way of an example use case, a user can use GUI 106 to specify the artwork to colorize. In some embodiments, vector graphics application 108 represents the specified artwork as a set of cubic Bezier splines that define the artwork.

At block 904, input is received establishing a color handle within the artwork. Continuing the example use case, the user can use GUI 106 to specify the color handle and an associated color and location within the artwork. Note that, as described previously, the color handle can be a point color handle, a line color handle, or a curve color handle. In some embodiments, the user can optionally specify an opacity for the selected color. At block 906, in response to the input received at block 904, an appropriate color handle is created at the specified location in the artwork.

At decision block 908, a determination is made as to whether there is an additional color handle to establish in the artwork. If a determination is made that there is another color handle to establish in the artwork, then, at block 904, input is received establishing a color handle within the artwork. Continuing the example use case, the user can specify another color handle to create in the artwork.

Otherwise, if a determination is made that there is no additional color handle to establish in the artwork, then, at block 910, a triangle mesh that corresponds to the artwork is generated. Continuing the example use case, having created the desired color handles, the user can use GUI 106 to request coloring of the specified artwork. In an example implementation, triangle mesh generation can be achieved by planarizing the artwork, and applying an offset for robustness. This prevents the boundary curves from becoming over-flattened due to sampling. Points can then be adaptively sampled along the curve depending on a quality parameter. Quality parameter will be further described below.

In the case of point color handles in the artwork, the point color handles can be added as Steiner points, which results in the point color handles being mapped as vertices of the generated triangle mesh. That is, in the generated mesh, there is a vertex at the location of a point color handle. In the case of line color handles in the artwork, the endpoints (the pair of line color handles) of each line segment can be added as Steiner points, which, similar to point color handles, results in the line color handles being mapped as vertices of the triangle mesh. The corresponding line segment can be added as an edge to the triangle mesh, such that one or more mesh vertices can lie along the edge. In the case of curve color handles in the artwork, the endpoints (the pair of curve color handles) of each curve segment (e.g., cubic Bezier segment) can be added as Steiner points, which, similar to point and line color handles, results in the curve color handles being mapped as vertices of the triangle mesh. The corresponding curve segment can be sampled at one or more points along the curve, and each sampled curve segment (e.g., smaller curve segments) can be added as an edge to the triangle mesh, such that one or more mesh vertices can lie along the edge. In some embodiments, the curve segment can be adaptively flattened based on the length of the curve segment, and the sampled points for the curve segment can be added as a polyline edge to the triangle mesh. For instance, a curve segment can be sampled based on the curve segment's geometry. For example, many samples can be taken along regions of high curvature, as compared to fewer samples being taken along regions of lower curvature. In a general sense, the color handles can be added as Steiner points to generate the triangle mesh. In the resulting triangle mesh, there is a mesh vertex at the location of each color handle. Each line segment can be added as an edge, such that one or more mesh vertices lie along the edge (line segment). Each curve segment is appropriately sampled at various points along the curve, and the resulting segments (e.g., smaller curve segments) are added as edges. This allows the mesh vertices at the locations of the color handles and the mesh vertices that lie along the line and curve segments to be used as boundary conditions, as will be further described below.

In some embodiments, a triangle mesh corresponding to the artwork is generated using conforming Delaunay triangulation. The generated triangle mesh accounts for the point color handles, line color handles, curve color handles, and line and curve segments created in the artwork. In some embodiments, the triangle mesh can be refined by iteratively subdividing the triangles in the mesh, as necessary.

Figure 10:
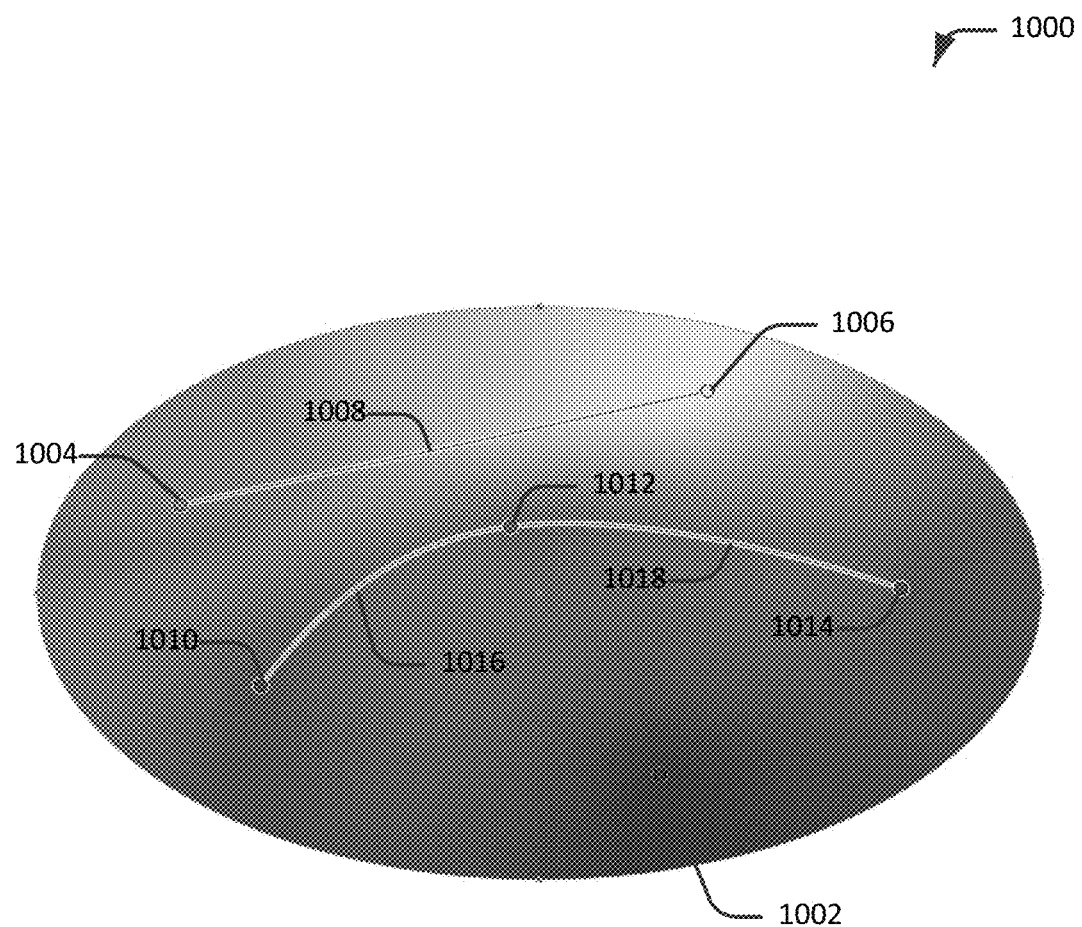
FIG. 10 illustrates an example vector graphics artwork including a point color handle, line color handles, and curve color handles, in accordance with an embodiment of the present disclosure.
Figure 11:
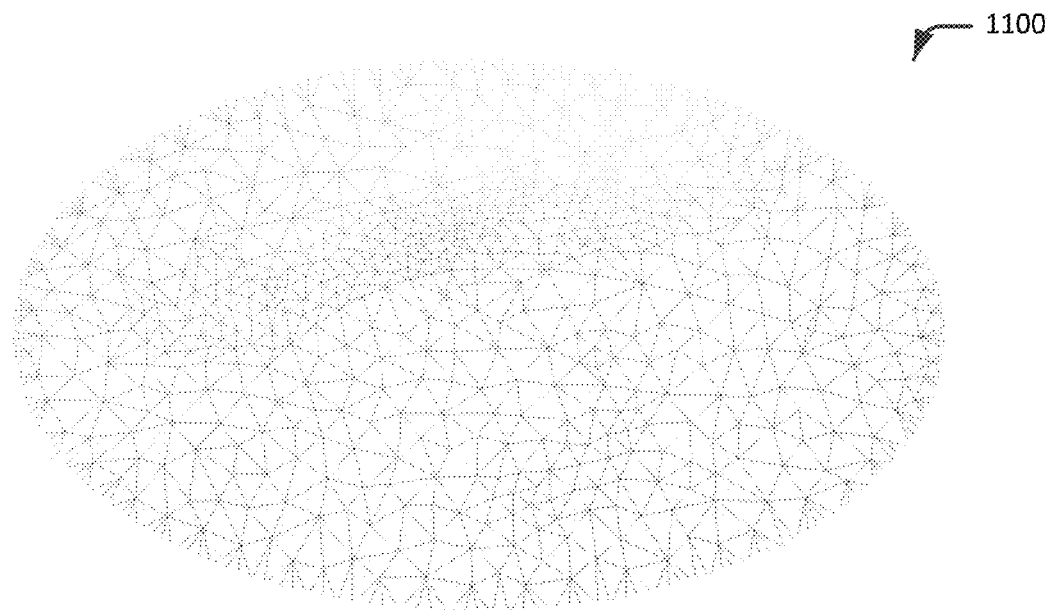
FIG. 11 illustrates an example triangle mesh generated from the vector graphics artwork of FIG. 10, in accordance with an embodiment of the present disclosure.
Figure 12:
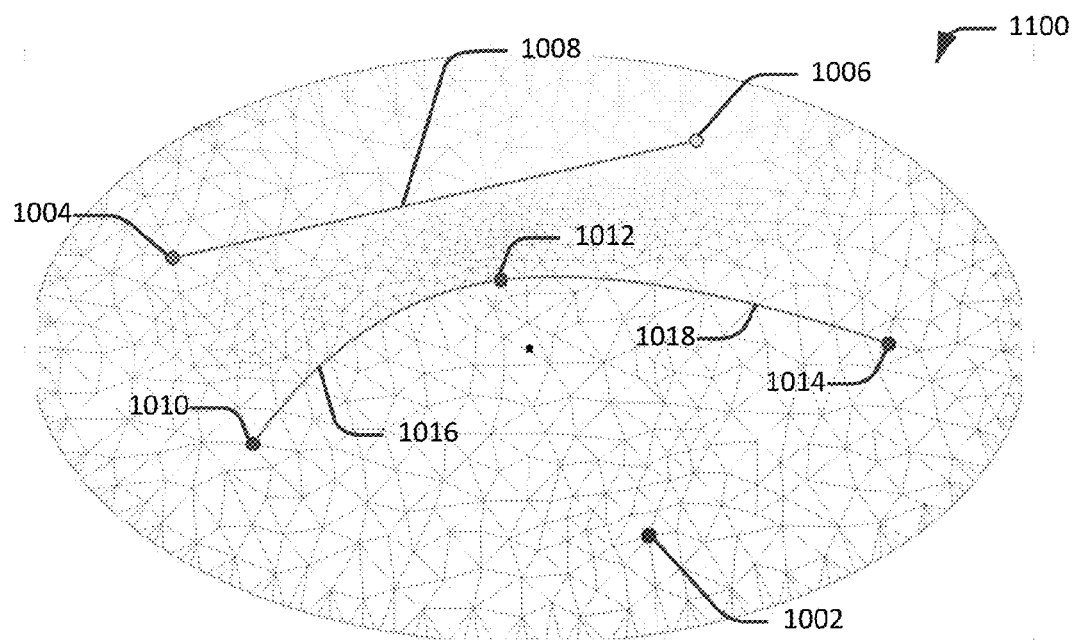
FIG. 12 illustrates the example triangle mesh of FIG. 11 including color handles, in accordance with an embodiment of the present disclosure.

FIG. 10 illustrates an example vector graphics artwork 1000 including a point color handle, line color handles, and curve color handles, in accordance with an embodiment of the present disclosure. For instance, artwork 1000 may have been specified by the user for coloring. Artwork 1000 as depicted in FIG. 10 includes a point color handle 1002, line color handles 1004 and 1006 connected by a line segment 1008, curve color handles 1010 and 1012 connected by a curve segment 1016, and curve color handles 1012 and 1014 connected by a curve segment 1018. FIG. 11 illustrates an example triangle mesh 1100 generated from vector graphics artwork 1000 of FIG. 10, in accordance with an embodiment of the present disclosure. Triangle mesh 1100 corresponds to artwork 1000, and demonstrates the shape coverage of artwork 1000. In some embodiments, triangle mesh 1100 can be represented in PDF as Type 4 shading (Free-Form Gouraud-Shaded Triangle Mesh). PDF Type 4 renders as a native PDF construct in applications that support PDF vector graphics and, therefore, supports print workflows. The resultant artwork is not a part of the source art tree. Rather, the resultant artwork is part of the render art tree and, as such, the operations variously described herein are non-destructive on the input artwork (e.g., the artwork being colored). For instance, the original curves selected by the user are not modified and are still available for editing as normal Bezier splines. For example, the user can change the shape of the curves or can change the location of color handles, to name two examples. Such user actions result in the regeneration of the triangle mesh transparent to the user. In some embodiments, information regarding the color points (color values) and their respective locations is stored in normalized coordinated space with respect to the selected curves. FIG. 12 illustrates example triangle mesh 1100 of FIG. 11 including color handles, in accordance with an embodiment of the present disclosure. As depicted, the color handles created on triangle mesh 1100 correspond to the color handles in artwork 1000 of FIG. 10.

Referring again to process 900, at block 912, a clipping path corresponding to the original artwork is applied to bound the generated triangle mesh based on the boundaries in the artwork to obtain smooth edges. In some embodiments, the applied clipping path is identical to the original artwork. The generated triangle mesh defines vertices throughout the mesh. A vertex in the mesh can be assigned a marker that indicates a color handle identifier.

At block 914, respective weights for each color channel of a specified color space are determined for mesh vertices in the vicinity of color handles in the mesh. In some embodiments, the determined weights for each color channels of the specified color space at the vertices in the triangle mesh in the vicinity of the color handles are used to initialize boundary conditions to the Laplacian equation. The Laplacian equation constrained by the boundary conditions is solved to compute the weights for the vertices in the mesh. For instance, the RGB color space includes three color channels, Red, Green, and Blue, and a respective weight is determined for each color channel. In some embodiments, the RGB color space can include a fourth component, an alpha channel for opacity, and a weight is determined for the opacity component. The CMYK color space includes four color channels, Cyan, Magenta, Yellow, and Black, and a respective weight is determined for each color channel. In some embodiments, the CMYK color space can include an alpha channel for opacity. In other embodiments, the CMYK color space can support one or more spot colors, and an additional weight can be determined for each supported spot color.

As described previously, a vertex in the triangle mesh can be assigned a marker that indicates a color handle identifier. The marker assigned to a mesh vertex can be used to determine whether the mesh vertex is a point color handle, a line color handle, or a curve color handle. For a mesh vertex that is a point color handle, the weight of each color channel is the weight of the corresponding color channel in the color point defined by the point color handle. For example, suppose the specified color space is the RGB color space, and a point color handle defines a red color point. In this case, the weight of the Red color channel can be set to 1.0, and the respective weights for the Green and Blue color channels can be set to 0.0. This process is iterated for each point color handle.

For a mesh vertex that is a line color handle that is an endpoint of a line segment (e.g., a line color handle located or positioned at the end of a line segment), the weight of each color channel is the weight of the corresponding color channel in the color point defined by the line color handle. In some embodiments, an arbitrary or otherwise pre-established number of mesh vertices in a line segment can be sampled, and the weights determined for the sampled mesh vertices used as boundary conditions. For instance, five, ten, fifteen, thirty, or other suitable number of mesh vertices in the line segment can be sampled. In an embodiment, the number of sampled mesh vertices is determined based on a quality parameter. For example, a "low" value for the quality parameter corresponds to a small number of mesh vertices being sampled, a "normal" (or "middle") value for the quality parameter corresponds to a larger number of mesh vertices being sampled, and a "high" value for the quality parameter corresponds to even a larger number of mesh vertices being sampled. Additionally or alternatively, the number of sampled mesh vertices can be determined based on the length of the line segment. For example, a smaller number of mesh vertices can be sampled in the case of a shorter line segment as compared to a larger number of mesh vertices being sampled in the case of a longer line segment. Numerous other specific mesh vertex sampling embodiments will be appreciated. In any such cases, the number of mesh vertices to sample may be tunable based on a desired performance, where a larger number of sampled mesh vertices can increase coloring quality, but decrease performance. For each sampled mesh vertex in a line segment, the weight of each color channel can be computed by linear interpolation of the respective color at the endpoints of the line segment. This weight computation process is iterated for each sampled mesh vertex in a line segment.

The weights for mesh vertices that are curve color handles can be computed in a similar manner to that described previously for line color handles. Likewise, in a manner similar to line segments described previously, an arbitrary or otherwise pre-established number of mesh vertices in a curve segment can be sampled, and the weights determined for the sampled mesh vertices used as boundary conditions.

At block 916, a color at each vertex in the triangle mesh is modeled as a solution to the harmonic, biharmonic, or triharmonic equation depending on a quality parameter. The calculated weights of the color channels of the color handles are used to initialize boundary conditions of the harmonic, biharmonic, or triharmonic equation. The color handles input to the harmonic, biharmonic, or triharmonic equation to initialize the boundary conditions include the point color handles, line color handles, curve color handles, and the sampled mesh vertices in the line segments and the curve segments. In some embodiments, a "low" value for the quality parameter corresponds to using a harmonic equation to calculate the respective weights of the color channels of the specified color space at the mesh vertices, a "normal" (or "middle") value for the quality parameter corresponds to using a biharmonic equation to calculate the respective weights of the color channels of the specified color space at the mesh vertices, and a "high" value for the quality parameter corresponds to using a triharmonic equation to calculate the weights of the color channels of the specified color space at the mesh vertices. Note that a higher quality parameter value results in smoother renderings and is less computationally efficient as compared to a lower quality parameter value. Once the weights are calculated for each vertex of the mesh, the final color (e.g., resulting color) at a mesh vertex is the linear combination of the calculated weights.

At block 918, a diffused color for each pixel in the artwork is set by interpolating between the resultant colors at the vertices of the mesh. The colors at the pixels in the artwork are colors diffused from the mesh vertices. Note that the color at a pixel that is at the location of a mesh vertex is the color determined from the linear combination of the weights of the color channels at the mesh vertex, for example, as calculated at block 816 above.

At block 920, the rendered colored artwork is displayed. The rendered artwork, for instance, can be displayed on a display device coupled to computing device 102. The rendered artwork is specified by the same cubic splines as the artwork specified by the user, and is produced with smooth diffused colors.

At decision block 922, a determination is made as to whether there is a change to the artwork. If a determination is made that there is a change to the artwork, then, at block 924, the color of each mesh vertex in the artwork is recalculated using the changed (e.g., updated) location and/or color values of the color handles, and the rendered recolored artwork is displayed at block 920. Otherwise, if a determination is made that there is no change to the artwork, then the rendered colored artwork can continue to be displayed at block 920.

In some embodiments, additional operations are performed. For example, in an embodiment, a size of the generated triangle mesh can be determined based on a value of a quality parameter. For example, a user can specify a value of the quality parameter used to determine the size of the triangle mesh that is generated. For instance, the size of the triangle mesh can be small, medium, or large based on the value specified for the quality parameter. Note that a smaller triangle mesh produces a higher quality color rendering as compared to a larger tringle mesh that produces a lower quality color rendering. As will be appreciated in light of this disclosure, the quality parameters variously described herein provide a balance between coloring quality and computational efficiency.

Formulation of the Model

In an example case of determining a color at each vertex in the triangle mesh as a solution to the biharmonic equation, $w_i$ denotes the variable representing the weights of the $i^{th}$ color channel in the domain (D). The final color at a mesh vertex $p \in D$ is then the aggregation of all the color channels in the specified color space. For example, in the RGB color space including an alpha channel, for example, for opacity, the final color over the entire domain (D) can be defined as:

$$(w_R(p), w_G(p), w_B(p), w_\alpha(p)) \quad [1]$$

To obtain a smoothly colored artwork, the weight function $w_i$ corresponding to each color channel can be modeled as a solution to the biharmonic equation:

$$\Delta^2 w_i = 0 \quad [2]$$

Equation [2] is equivalent to minimizing the Laplace energy:

$$\min_{w_i, i=1,\ldots,n} \sum_{i=1}^{n} \frac{1}{2} \int_D (\Delta w_i)^2 dA \quad [3]$$

where n is the number of channels in the specified color space (e.g., RGB: 3 channels; CMYK: 4 channels; etc.). Note that there can be an additional weight corresponding to the alpha component (e.g., opacity) if present in the specified color space. The Laplacian energy [3] is minimized subject to boundary conditions that are added as a set of linear constraints. The boundary conditions are derived from the point, line, and curve color handles created in the specified artwork as variously described herein. Note that the boundary conditions can also be derived from the sampled mesh vertices in the line segments and the curve segments as variously described herein.

$$w_i = C_i^m \quad [4]$$

$$0 \leq w_i(p) \leq 1 \quad [5]$$

$$\sum_{i=1}^{n} w_i(p) = 1 \quad [6]$$

Equation [4] summarizes the boundary conditions imposed upon the system. Equation [5] guarantees that the weights are positive and bounded. This ensures that the system is free from local minima except at the corresponding color handles. Equation [6] ensures that every point in domain (D) is a "diffusion" of colors.

Note that, since the number of equations to be solved is equal to the number of channels in the specified color space and independent of the number of color handles, the formulation obtains an amortized constant time complexity irrespective of the number of color handles. The solution is $C^1$ at the color handles, and $C^\infty$ everywhere else in the domain. It will be appreciated that this imparts an inherent smoothness to the color diffusion.

In an embodiment, to perform the diffusion coloring procedure, the Laplacian energy [3] is discretized using the standard linear FEM Laplacian $M^1L$, where M is the lumped mass matrix, and L is the symmetric stiffness matrix (e.g., the cotangent Laplacian):

$$\sum_{i=1}^{n} \frac{1}{2} \int_D (\Delta w_i)^2 dA \approx \frac{1}{2} \sum_{i=1}^{n} w_i^T (LM^{-1}L) w_i \quad [7]$$

The energy term [7] is quadratic in the unknown $w_i$ and convex subject to linear equalities and inequalities. For the two-dimensional surface D, L and M have the following forms when the underlying shape is a triangular mesh:

$$L_{ij} = -\frac{1}{2}(\cot \alpha_{ij} + \cot \beta_{ij}) \quad [8]$$

$$M_{ij} = \int_D \phi_i \phi_j dA \quad [9]$$

where $\phi_i$ and $\phi_j$ are hat functions locally supported upon the triangular mesh.

Figure 14:
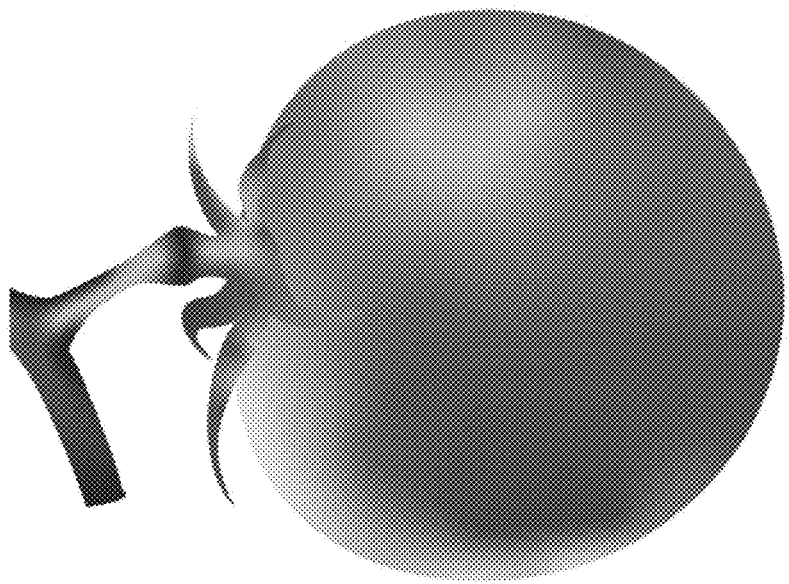
FIG. 14 illustrates the coloring created in the vector graphics artwork of FIG. 13, in accordance with an embodiment of the present disclosure.
Figure 13:
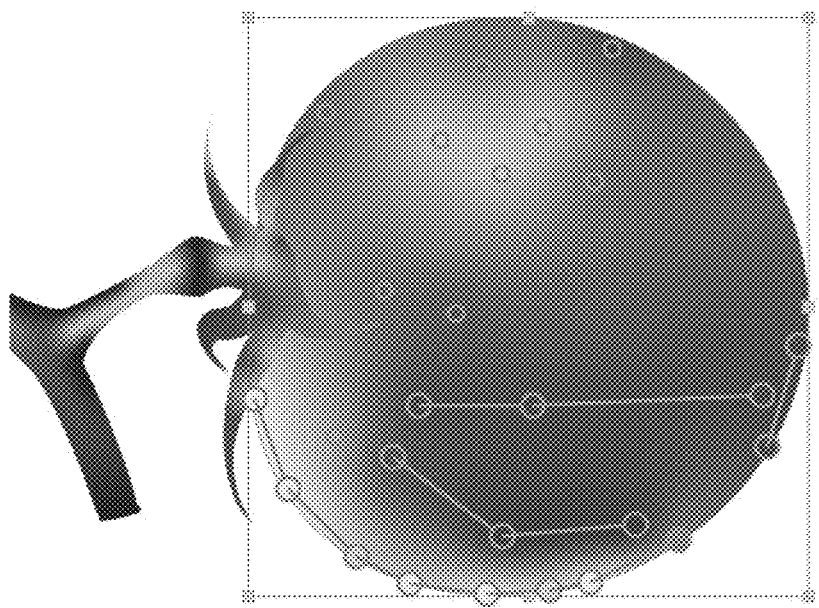
FIG. 13 illustrates an example vector graphics artwork including point and line color handles, in accordance with an embodiment of the present disclosure.

FIG. 13 illustrates an example vector graphics artwork 1300 including point and line color handles, in accordance with an embodiment of the present disclosure. As can be seen, artwork 1300 is an image of a tomato, and includes 10 point color handles and 16 line color handles connecting 12 line segments. Specifically, eight line color handles connect seven line segments, three line color handles connect two line segments, another three line color handles connect two line segments, and two line color handles connect one line segment. FIG. 14 illustrates artwork 1300 with the diffusion coloring resulting from the 10 point color handles and the 16 line color handles shown in FIG. 13.

Figure 16:
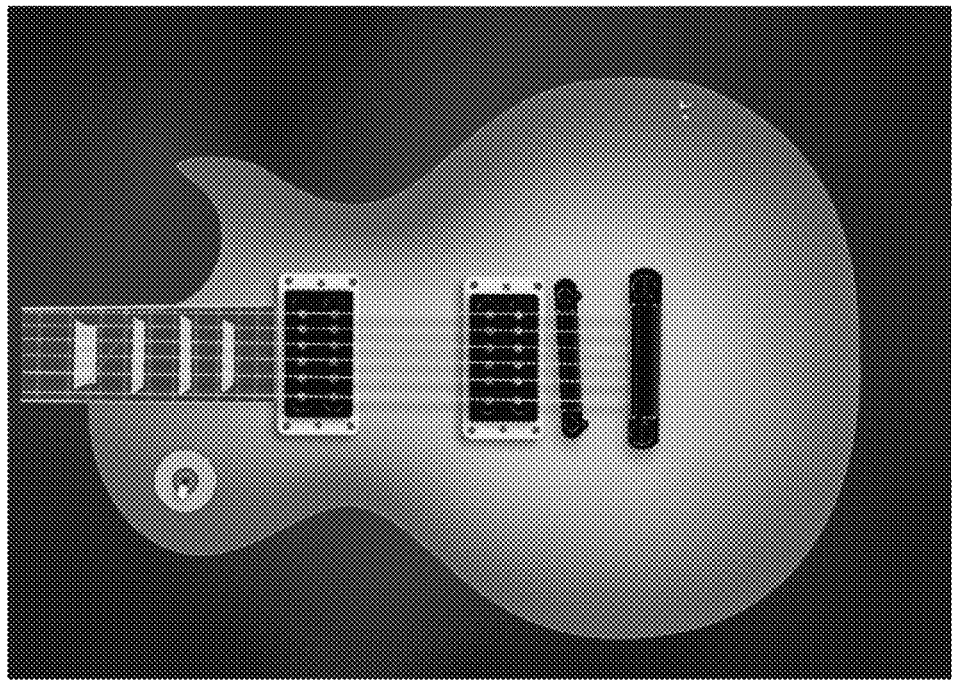
FIG. 16 illustrates the shape-aware coloring created in the vector graphics artwork of FIG. 15, in accordance with an embodiment of the present disclosure.
Figure 15:
FIG. 15 illustrates an example vector graphics artwork including curve color handles, in accordance with an embodiment of the present disclosure.

FIG. 15 illustrates an example vector graphics artwork 1500 including curve color handles, in accordance with an embodiment of the present disclosure. As can be seen, artwork 1500 is an image of a guitar, and includes 22 curve color handles. The black background color in artwork 500 is created using point color handles (not depicted). As described previously, the curve color handles, and the curve segments connecting the curve color handles, provide shape-aware diffusion coloring of artwork 1500, as illustrated in FIG. 16.

Figure 17:
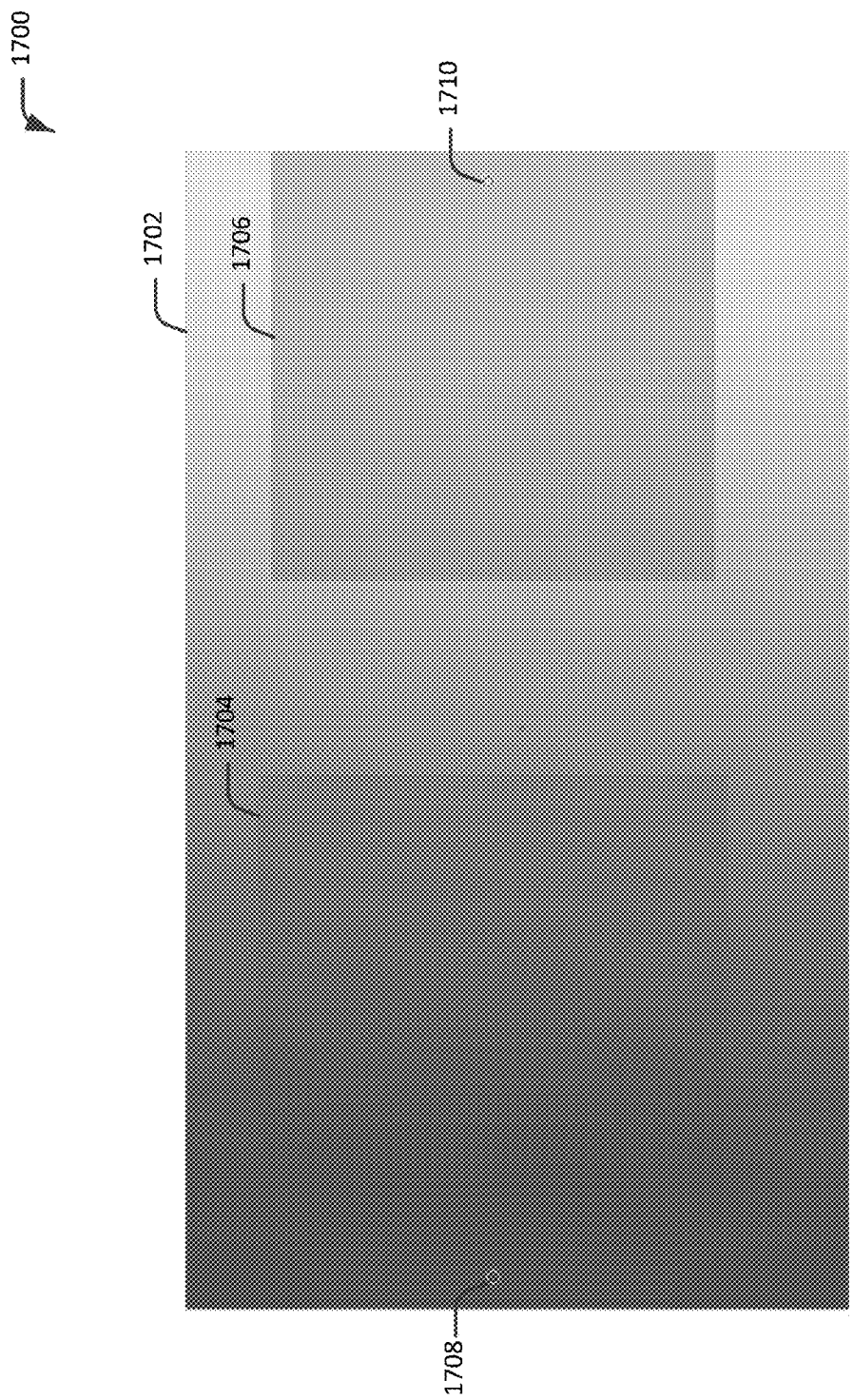
FIG. 17 illustrates opacity smoothly diffused throughout an example vector graphics artwork, in accordance with an embodiment of the present disclosure.

FIG. 17 illustrates opacity smoothly diffused throughout an example vector graphics artwork 1700, in accordance with an embodiment of the present disclosure. As described previously, opacity can be added to color handles, in which case the Laplacian equation is solved for the additional alpha channel for opacity. By way of an example, a user can specify an opacity value for a color (e.g., color point). In an embodiment, the opacity added to color handles in an artwork is smoothly diffused along the entire artwork. Artwork 1700 as depicted in FIG. 17 includes a topmost rectangle 1702 that is enclosing smaller rectangles 1704 and 1706. Rectangle 1702 includes point color handles 1708 and 1710. As depicted, point color handle 1708 defines a blue color point having an opacity value of 100 percent, and point color handle 1710 defines a yellow color point having an opacity value of 75 percent. As can be seen, the 100 percent opacity at point color handle 1708 diffuses along with the blue color defined by point color handle 1708 through artwork 1700. Similarly, the 75 percent opacity at point color handle 1710 diffuses along with the yellow color defined by point color handle 1710 through artwork 1700. In an embodiment, the opacity at a color handle diffuses in the same manner as the color defined by the color handle. For example, opacity at a point color handle diffuses along a radial direction in a manner similar to the color defined by the point color handle. Similarly, opacity at a line color handle diffuses along a direction of a line segment connected to the line color handle, and opacity at a curve color handle diffuses along the shape of a curve segment connected to the curve color handle.

Figure 18:
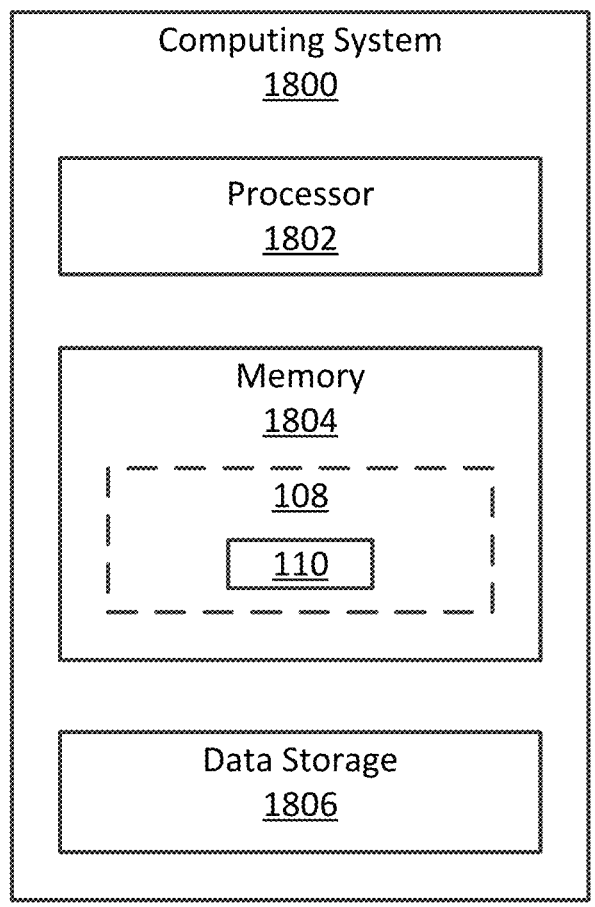
FIG. 18 is a block diagram illustrating selected components of an example computing system that may be used to perform any of the techniques as variously described in the present disclosure, according to an embodiment.

FIG. 18 is a block diagram illustrating selected components of an example computing system 1800 that may be used to perform any of the techniques as variously described in the present disclosure, according to an embodiment. In some embodiments, computing system 1800 may be configured to implement or direct one or more operations associated with some or all of the engines, components and/or modules associated with vector graphics application 108 of FIG. 1. For example, vector graphics application 108, including coloring agent 110, may be implemented in and/or using computing system 1800. In one example case, for instance, each of vector graphics application 108 and coloring agent 110 is loaded in a memory 1804 and executable by a processor 1802. Computing system 1800 may be any computer system, such as a workstation, desktop computer, server, laptop, handheld computer, tablet computer (e.g., the iPad® tablet computer), mobile computing or communication device (e.g., the iPhone® mobile communication device, the Android™ mobile communication device, and the like), or other form of computing or telecommunications device that is capable of communication and that has sufficient processor power and memory capacity to perform the operations described in this disclosure. A distributed computational system may be provided that includes a multiple of such computing devices. As depicted, computing system 1800 may include processor 1802, memory 1804, and a data storage 1806. Processor 1802, memory 1804, and data storage 1806 may be communicatively coupled.

In general, processor 1802 may include any suitable special-purpose or general-purpose computer, computing entity, or computing or processing device including various computer hardware, firmware, or software modules, and may be configured to execute instructions, such as program instructions, stored on any applicable computer-readable storage media. For example, processor 1802 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 18, processor 1802 may include any number of processors and/or processor cores configured to, individually or collectively, perform or direct performance of any number of operations described in the present disclosure. Additionally, one or more of the processors may be present on one or more different electronic devices, such as different servers.

In some embodiments, processor 1802 may be configured to interpret and/or execute program instructions and/or process data stored in memory 1804, data storage 1806, or memory 1804 and data storage 1806. In some embodiments, processor 1802 may fetch program instructions from data storage 1806 and load the program instructions in memory 1804. After the program instructions are loaded into memory 1804, processor 1802 may execute the program instructions.

For example, in some embodiments, any one or more of the engines, components and/or modules of vector graphics system 100 may be included in data storage 1806 as program instructions. Processor 1802 may fetch some or all of the program instructions from data storage 1806 and may load the fetched program instructions in memory 1804. Subsequent to loading the program instructions into memory 1804, processor 1802 may execute the program instructions such that the computing system may implement the operations as directed by the instructions.

In some embodiments, virtualization may be employed in computing device 1800 so that infrastructure and resources in computing device 1800 may be shared dynamically. For example, a virtual machine may be provided to handle a process running on multiple processors so that the process appears to be using only one computing resource rather than multiple computing resources. Multiple virtual machines may also be used with one processor.

Memory 1804 and data storage 1806 may include computer-readable storage media for carrying or having computer-executable instructions or data structures stored thereon. Such computer-readable storage media may include any available media that may be accessed by a general-purpose or special-purpose computer, such as processor 1802. By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause processor 1802 to perform a certain operation or group of operations.

Modifications, additions, or omissions may be made to computing system 1800 without departing from the scope of the present disclosure. For example, in some embodiments, computing system 1800 may include any number of other components that may not be explicitly illustrated or described herein.

As indicated above, the embodiments described in the present disclosure may include the use of a special purpose or a general purpose computer (e.g., processor 1802 of FIG. 18) including various computer hardware or software modules, as discussed in greater detail herein. As will be appreciated, once a general purpose computer is programmed or otherwise configured to carry out functionality according to an embodiment of the present disclosure, that general purpose computer becomes a special purpose computer. Further, as indicated above, embodiments described in the present disclosure may be implemented using computer-readable media (e.g., memory 1804 of FIG. 18) for carrying or having computer-executable instructions or data structures stored thereon.

Numerous example variations and configurations will be apparent in light of this disclosure. According to some examples, computer-implemented methods to color a vector graphics artwork are described. An example computer-implemented method may include: receiving input defining multiple color handles within an artwork, wherein each of the color handles defines a particular color at a particular location in the artwork, and wherein the particular color is represented by i color channels; defining multiple vertices distributed throughout the artwork; modeling color in the artwork using a Laplacian equation, wherein the color handles are boundary conditions on the Laplacian equation; determining a resultant color at each vertex of the multiple vertices by solving the Laplacian equation for each of the i color channels, wherein solving the Laplacian equation for each of the i color channels produces a corresponding i color values that collectively define the resultant color; determining a color for each pixel of multiple pixels in the artwork by interpolating between the resultant colors at the multiple vertices; and causing display of a rendered colored artwork, the rendered colored artwork including the determined color for the one or more pixels.

In some examples, the input includes a quality parameter, and wherein the Laplacian equation is one of a harmonic, biharmonic, or triharmonic equation as determined by the quality parameter. In other examples, the boundary conditions include multiple weights, each weight of the multiple weights corresponding to a color channel of the i color channels. In still other examples, the color channels are in a RGB color space. In yet other examples, the color channels are in a CMYK color space. In further examples, the color channels include an alpha channel for opacity, and a weight is assigned to the alpha channel. In still further examples, the multiple color handles include at least one of a point color handle, a line color handle, and a curve color handle. In yet further examples, the multiple vertices correspond to points in a triangular mesh corresponding to the artwork, wherein the triangle mesh is generated using Delaunay triangulation. In other examples, the multiple color handles include at least one sampled mesh vertex, the mesh vertex being in a line segment or a curve segment.

According to some examples, computer program products including one or more non-transitory machine-readable mediums encoded with instructions that when executed by one or more processors cause a process to be carried out to color a vector graphics artwork are described. An example process may include: receiving input defining multiple color handles within an artwork, wherein each of the color handles defines a particular color at a particular location in the artwork, and wherein the particular color is represented by i color channels; defining multiple vertices distributed throughout the artwork; modeling color in the artwork using a Laplacian equation, wherein the color handles are boundary conditions on the Laplacian equation; determining a resultant color at each vertex of the multiple vertices by solving the Laplacian equation for each of the i color channels, wherein solving the Laplacian equation for each of the i color channels produces a corresponding i color values that collectively define the resultant color; determining a color for each pixel of multiple pixels in the artwork by interpolating between the resultant colors at the multiple vertices; and causing display of a rendered colored artwork, the rendered colored artwork including the determined color for the one or more pixels.

In some examples, the input includes a quality parameter, and wherein the Laplacian equation is one of a harmonic, biharmonic, or triharmonic equation as determined by the quality parameter. In other examples, the boundary conditions include multiple of weights, each weight of the multiple weights corresponding to a color channel of the i color channels. In still other examples, the multiple color handles include a point color handle and an associated color corresponding to the point color handle, wherein the color diffuses along a radial direction from the point color handle. In yet other examples, the multiple color handles include a line color handle and an associated color corresponding to the line color handle, wherein the color diffuses along a direction of a line segment connecting the line color handle. In further examples, the multiple color handles include a curve color handle and an associated color corresponding to the curve color handle, wherein the color diffuses along a shape of a curve segment connecting the curve color handle. In still further examples, the color channels are in one of a RGB color space or a CMYK color space. In yet further examples, at least one color handle of the multiple color handles is associated with an opacity value.

According to some examples, systems to color a vector graphics artwork are described. An example system may include: one or more non-transitory machine-readable mediums configured to store instructions; and one or more processors configured to execute the instructions stored on the one or more non-transitory machine-readable mediums. Execution of the instructions by the one or more processors may cause the one or more processors to: receive input defining multiple color handles within an artwork, wherein each of the color handles defines a particular color at a particular location in the artwork, and wherein the particular color is represented by i color channels; define multiple vertices distributed throughout the artwork; model color in the artwork using a Laplacian equation, wherein the color handles are boundary conditions on the Laplacian equation; determine a resultant color at each vertex of the multiple vertices by solving the Laplacian equation for each of the i color channels, wherein solving the Laplacian equation for each of the i color channels produces a corresponding i color values that collectively define the resultant color; determine a color for each pixel of multiple pixels in the artwork by interpolating between the resultant colors at the multiple vertices; and cause display of a rendered colored artwork, the rendered colored artwork including the determined color for the one or more pixels.

In some examples, the input includes a quality parameter, and wherein the Laplacian equation is one of a harmonic, biharmonic, or triharmonic equation as determined by the quality parameter. In other examples, the color channels are in one of a RGB color space or a CMYK color space.

As used in the present disclosure, the terms "engine" or "module" or "component" may refer to specific hardware implementations configured to perform the actions of the engine or module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations, firmware implements, or any combination thereof are also possible and contemplated. In this description, a "computing entity" may be any computing system as previously described in the present disclosure, or any module or combination of modulates executing on a computing system.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure. Accordingly, it is intended that the scope of the present disclosure be limited not by this detailed description, but rather by the claims appended hereto.

What is claimed is:

1. A computer-implemented method to color a vector graphics artwork, the method comprising:
    receiving input defining a plurality of color handles within an artwork, wherein each of the color handles defines a particular color at a particular location in the artwork, and wherein the particular color is represented by i color channels, wherein i≥1;
    defining a plurality of vertices distributed throughout the artwork;
    modeling color in the artwork using a Laplacian equation, wherein the color handles are boundary conditions on the Laplacian equation;
    determining a resultant color at each vertex of the plurality of vertices by solving the Laplacian equation for each of the i color channels, wherein solving the Laplacian equation for each of the i color channels produces a corresponding i color values that collectively define the resultant color;
    determining a color for each pixel of a plurality of pixels in the artwork by interpolating between the resultant colors at the plurality of vertices; and
    causing display of a rendered colored artwork, the rendered colored artwork including the determined color for the one or more pixels.

2. The method of claim 1, wherein the input includes a quality parameter, and wherein the Laplacian equation is one of a harmonic, biharmonic, or triharmonic equation as determined by the quality parameter.

3. The method of claim 1, wherein the boundary conditions include a plurality of weights, each weight of the plurality of weights corresponding to a color channel of the i color channels.

4. The method of claim 1, wherein the color channels are in a RGB color space.

5. The method of claim 1, wherein the color channels are in a CMYK color space.

6. The method of claim 1, wherein the color channels include an alpha channel for opacity, and a weight is assigned to the alpha channel.

7. The method of claim 1, wherein the plurality of color handles includes at least one of a point color handle, a line color handle, and a curve color handle.

8. The method of claim 1, wherein the plurality of vertices corresponds to points in a triangular mesh corresponding to the artwork, wherein the triangle mesh is generated using Delaunay triangulation.

9. The method of claim 8, wherein the plurality of color handles includes at least one sampled mesh vertex, the mesh vertex being in a line segment or a curve segment.

10. A computer program product including one or more non-transitory machine-readable mediums encoded with instructions that when executed by one or more processors cause a process to be carried out to color a vector graphics artwork, the process comprising:
    receiving input defining a plurality of color handles within an artwork, wherein each of the color handles defines a particular color at a particular location in the artwork, and wherein the particular color is represented by i color channels, wherein i≥1;

defining a plurality of mesh vertices distributed throughout the artwork;

modeling color in the artwork using a Laplacian equation, wherein the color handles are boundary conditions on the Laplacian equation;

determining a resultant color at each vertex of the plurality of vertices by solving the Laplacian equation for each of the i color channels, wherein solving the Laplacian equation for each of the i color channels produces a corresponding i color values that collectively define the resultant color;

determining a color for each pixel of a plurality of pixels in the artwork by interpolating between the resultant colors at the plurality of mesh vertices; and causing display of a rendered colored artwork, the rendered colored artwork including the determined color for the one or more pixels.

11. The computer program product of claim 10, wherein the input includes a quality parameter, and wherein the Laplacian equation is one of a harmonic, biharmonic, or triharmonic equation as determined by the quality parameter.

12. The computer program product of claim 10, wherein the boundary conditions include a plurality of weights, each weight of the plurality of weights corresponding to a color channel of the i color channels.

13. The computer program product of claim 10, wherein the plurality of color handles includes a point color handle and an associated color corresponding to the point color handle, wherein the color diffuses along a radial direction from the point color handle.

14. The computer program product of claim 10, wherein the plurality of color handles includes a line color handle and an associated color corresponding to the line color handle, wherein the color diffuses along a direction of a line segment connecting the line color handle.

15. The computer program product of claim 10, wherein the plurality of color handles includes a curve color handle and an associated color corresponding to the curve color handle, wherein the color diffuses along a shape of a curve segment connecting the curve color handle.

16. The computer program product of claim 10, wherein the color channels are in one of a RGB color space or a CMYK color space.

17. The computer program product of claim 10, wherein at least one color handle of the plurality of color handles is associated with an opacity value.

18. A system to color a vector graphics artwork, the system comprising:
one or more non-transitory machine-readable mediums configured to store instructions; and
one or more processors configured to execute the instructions stored on the one or more non-transitory machine-readable mediums, wherein execution of the instructions causes the one or more processors to
receive input defining a plurality of color handles within an artwork, wherein each of the color handles defines a particular color at a particular location in the artwork, and wherein the particular color is represented by i color channels, wherein $i \geq 1$;
define a plurality of mesh vertices distributed throughout the artwork;
model color in the artwork using a Laplacian equation, wherein the color handles are boundary conditions on the Laplacian equation;
determine a resultant color at each vertex of the plurality of vertices by solving the Laplacian equation for each of the i color channels, wherein solving the Laplacian equation for each of the i color channels produces a corresponding i color values that collectively define the resultant color;
determine a color for each pixel of a plurality of pixels in the artwork by interpolating between the resultant colors at the plurality of mesh vertices; and
cause display of a rendered colored artwork, the rendered colored artwork including the determined color for the one or more pixels.

19. The system of claim 18, wherein the input includes a quality parameter, and wherein the Laplacian equation is one of a harmonic, biharmonic, or triharmonic equation as determined by the quality parameter.

20. The system of claim 18, wherein the color channels are in one of a RGB color space or a CMYK color space.

* * * * *